US012350534B2

(12) United States Patent
Tomiyama et al.

(10) Patent No.: US 12,350,534 B2
(45) Date of Patent: Jul. 8, 2025

(54) EXTINGUISHANT COMPOSITION

(71) Applicant: YAMATO PROTEC CORPORATION, Osaka (JP)

(72) Inventors: Shogo Tomiyama, Inashiki-gun (JP); Akimitsu Kikkawa, Inashiki-gun (JP); Yuki Takatsuka, Inashiki-gun (JP)

(73) Assignee: YAMATO PROTEC CORPORATION, Tokyo (JP)

( * ) Notice: Subject to any disclaimer, the term of this patent is extended or adjusted under 35 U.S.C. 154(b) by 144 days.

(21) Appl. No.: 16/071,190

(22) PCT Filed: Jun. 6, 2016

(86) PCT No.: PCT/JP2016/002722
§ 371 (c)(1),
(2) Date: Jul. 19, 2018

(87) PCT Pub. No.: WO2017/134703
PCT Pub. Date: Aug. 10, 2017

(65) Prior Publication Data

US 2024/0382793 A1 Nov. 21, 2024

(30) Foreign Application Priority Data

Feb. 2, 2016 (JP) ................................ 2016-017920

(51) Int. Cl.
*A62D 1/06* (2006.01)
*A62C 19/00* (2006.01)
(Continued)

(52) U.S. Cl.
CPC ................ *A62D 1/06* (2013.01); *A62C 19/00* (2013.01); *A62C 35/13* (2013.01); *A62D 1/00* (2013.01); *C06B 23/00* (2013.01); *C06D 5/00* (2013.01)

(58) Field of Classification Search
None
See application file for complete search history.

(56) References Cited

U.S. PATENT DOCUMENTS 5,425,426 A * 6/1995 Baratov .............. A62D 1/0014 169/46
6,024,889 A 2/2000 Holland et al.
(Continued)

FOREIGN PATENT DOCUMENTS

EP 0561035 A1 9/1993
JP 7-503159 A 4/1995
(Continued)

OTHER PUBLICATIONS

International Search Report dated Aug. 2, 2016, issued in counterpart application No. PCT/JP2016/002722. (2 pages).

*Primary Examiner* — Joseph D Anthony
(74) *Attorney, Agent, or Firm* — WHDA, LLP

(57) ABSTRACT

To provide an extinguishant composition that can be used as an extinguishant in the event of a fire, and an aerosol-generating automatic fire-extinguishing device in which the extinguishant is used. An extinguishant composition and an aerosol-generating automatic fire extinguishing device containing the extinguishant composition, said composition being characterized in containing 20-50% by mass of a fuel and 80-50% by mass of a chlorate, and further containing 6-1000 parts by mass of a potassium salt in relation to a total of 100 parts by mass of the fuel and the chlorate, the extinguishant composition having a thermal decomposition starting temperature in the range of over 90° C. to 260° C.

8 Claims, 1 Drawing Sheet

(51) Int. Cl.

| | |
|---|---|
| ***A62C 35/13*** | (2006.01) |
| ***A62D 1/00*** | (2006.01) |
| ***C06B 23/00*** | (2006.01) |
| ***C06D 5/00*** | (2006.01) |

(56) References Cited

U.S. PATENT DOCUMENTS 6,045,637 A * 4/2000 Grzyll .................... A62D 1/00 149/19.3
2010/0187465 A1* 7/2010 Guo .................... A62D 1/0092 252/5

FOREIGN PATENT DOCUMENTS

| | | | |
|---|---|---|---|
| JP | 11-256165 | A | 9/1999 |
| JP | 2004-89597 | A | 3/2004 |
| JP | 2009-72594 | A | 4/2009 |
| JP | 2010-532687 | A | 10/2010 |
| KR | 101209706 | B1 | 12/2012 |
| RU | 2357778 | C2 | 6/2009 |
| RU | 2480259 | C1 | 4/2013 |

* cited by examiner

EXTINGUISHANT COMPOSITION

TECHNICAL FIELD

The present invention relates to an extinguishant composition which can suppress and extinguish a fire by generating an aerosol through combustion and an aerosol-generating automatic fire-extinguishing automatic aerosol generating fire extinguishing device using the same.

BACKGROUND ART

Common fire extinguishers, extinguishing devices and the like are filled with a fire extinguishant in the powdery state. Basically, such fire extinguishers and extinguishing devices have a function that, when diffusing an extinguishant in a fine powder state toward the flame during operation, radicals such as potassium radicals are generated instantly, and the generated radicals catch the hydrogen radical, oxygen radical and/or hydroxyl radical which promote the combustion reaction to extinguish the fire.

However, since these extinguishers and extinguishing devices using powder type extinguishants diffuse the powder as it is, they need to be a large and bulky container, and since the powder is ejected instantly, the container should be a high pressure resistant container, which becomes heavy.

On the other hand, for example, in Patent Document 1 (Russian Patent No. 2357778 C2), in order to realize a more compact extinguishing device, by using a pyrotechnic composition composed of dicyandiamide as a fuel component and potassium nitrate as an oxidizing component, it has been proposed to generate an aerosol containing a potassium radical derived from the oxidizing agent.

Further, for example, Patent Document 2 (Korean Patent No. 101209706 B1) discloses a system where potassium citrate is added as the oxidizing agent, but since an inorganic oxidizing agent is superior in oxidizing power, it is difficult to realize the system because sufficient redox reaction which promotes spontaneous combustion cannot occur.

PRIOR ART DOCUMENT

Patent Document

Patent Document 1: Russian Patent No. 2357778 C2
Patent Document 2: Korean Patent No. 101209706 B1

SUMMARY OF THE INVENTION

Problem to be Solved by the Invention

The present invention provides an extinguishant composition which can make an extinguisher, an extinguishing device or the like more compact and lightweight in comparison with the case where a powder-type extinguishant is used, and an aerosol-generating automatic extinguishing device using the extinguishant composition.

Means to Solve the Above Problem

In order to achieve the above object, the inventors of the present invention repeatedly conducted intensive studies on the ingredients of the extinguishant and its formulation, and as a result, have found that when a thermal decomposition starting temperature is controlled within the specific range by combining a fuel, a chlorate and a potassium salt, it is effective to realize an extinguishant composition that can make an extinguisher and an extinguishing device or the like more compact and lightweight, and have reached the present invention.

Namely, the present invention relates to an extinguishant composition comprising 20 to 50% by mass of a fuel and 80 to 50% by mass of a chlorate,
and further 6 to 1000 parts by mass of a potassium salt in relation to a total of 100 parts by mass of the fuel and the chlorate, and having a thermal decomposition starting temperature in the range of over 90° C. to 260° C., and further relates to an aerosol-generating automatic fire-extinguishing device comprising the extinguishant composition.

According to the extinguishant composition of the present invention having such a formulation, it is possible to make an extinguisher, an extinguishing device or the like more compact and lightweight in comparison with the case where a conventional powder-type extinguishant is used. Accordingly, the aerosol-generating automatic fire-extinguishing device is compact and lightweight in comparison with the conventional extinguisher, extinguishing device or the like.

Effects of the Invention

Since the extinguishant composition and the aerosol-generating automatic fire-extinguishing device by using the same does not diffuse the powder as it is, but can generate an aerosol having an extinguishing ability which is ignited and burned automatically by the heat due to a fire. Therefore, it is possible to make an extinguisher, an extinguishing device or the like more compact and lightweight in comparison with the case where the powder-type extinguishant is used.

MODE FOR CARRYING OUT THE INVENTION

Figure 1:
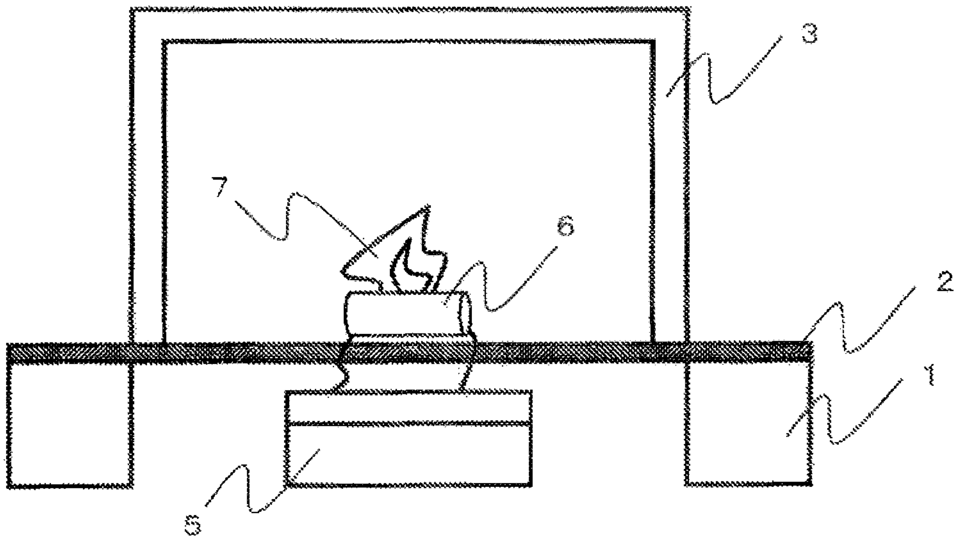
FIG. 1 is a diagram for explaining a test method of a confirmation test of extinguishing test by using an extinguishant composition of the present invention (combustion space volume being 5 L).

In the following, by referring the drawings, typical embodiments of the extinguishant composition and the aerosol-generating automatic fire-extinguishing device of the present invention are explained. But the present invention is not limited thereto. In addition, since these drawings are presented to explain the concept of the present invention, in order to understand easily, there are cases where sizes, ratios and numerals may be magnified or simplified as occasion demand.

<Extinguishant Composition>

The extinguishant composition of the present invention is characterized by comprising 20 to 50% by mass of a fuel (Component A) and 80 to 50% by mass of a chlorate (Component B), and further 6 to 1000 parts by mass of a potassium salt (Component C) in relation to a total of 100 parts by mass of the fuel and the chlorate, and having a thermal decomposition starting temperature in the range of over 90° C. to 260° C., and further relates to an aerosol-generating automatic fire-extinguishing device comprising the extinguishant composition.

The fuel of Component A is a component which generates the aerosol (potassium radical) derived from the potassium salt of Component C by burning with the chlorate of Component B to produce thermal energy.

Preferred examples of the fuel of Component A includes at least one selected from dicyandiamide, nitroguanidine, guanidine nitrate, urea, melamine, melamine cyanurate, avicel, guar gum, sodium carboxymethylcellulose, potassium carboxymethylcellulose, ammonium carboxymethylcellulose, nitrocellulose, aluminum, boron, magnesium, magnalium, zirconium, titanium, titanium hydride, tungsten and silicon.

The chlorate of Component B is a strong oxidizing agent, and generates the aerosol (potassium radical) derived from the potassium salt of Component C by burning with the fuel of Component A to produce thermal energy.

Preferred examples of the chlorate of Component B include at least one selected from potassium chlorate, sodium chlorate, strontium chlorate, ammonium chlorate and magnesium chlorate.

Here, the contents in relation to the total amount 100% by mass of the fuel of Component A and the chlorate of Component B are as follows:

Component A: 20 to 50% by mass
  Preferably 25 to 40% by mass
  More preferably 25 to 35% by mass
Component B: 80 to 50% by mass
  Preferably 75 to 60% by mass
  More preferably 75 to 65% by mass Next, the potassium salt of Component C is a component which generates the aerosol (potassium radical) by burning with the fuel of Component A and the chlorate of Component B to produce thermal energy.

Preferred examples of the potassium salt of Component C include at least one selected from potassium acetate, potassium propionate, monopotassium citrate, dipotassium citrate, tripotassium citrate, potassium trihydrogen ethylenediaminetetraacetate, dipotassium dihydrogen ethylenediaminetetraacetate, tripotassium hydrogen ethylenediaminetetraacetate, tetrapotassium ethylenediaminetetraacetate, potassium hydrogen phthalate, dipotassium phthalate, potassium hydrogen oxalate, dipotassium oxalate, and potassium bicarbonate.

The content of the potassium salt of Component C in relation to the total of 100 parts by mass of Component A and Component B is preferably 60 to 1000 parts by mass, and more preferably 10 to 900 parts by mass.

According to the extinguishant composition of the present invention, the thermal decomposition starting temperature is in the range of over 90° C. to 260° C., and preferably over 150° C. to 260° C. This range of the thermal decomposition starting temperature can be prepared by combining the Component A, Component B and Component C in the aforementioned range.

When the extinguishant composition of the present invention satisfies the aforementioned range of the thermal decomposition starting temperature, it is possible to automatically ignite Component A and Component B by receiving the heat at the time of fire without using an ignition device or the like to burn, and to generate the aerosol (potassium radical) derived from Component C, and then to extinguish the fire.

Since an ignition temperature of ordinary wood as a flammable material in a room is 260° C. and a general operating temperature of a heat sensor of an automatic fire alarm system which is installed in a place handling fire is 90° C. or low, when setting the thermal decomposition starting temperature within the condition where the sensor would not be activated, it is possible to instantly extinguish the fire and prevent erroneous operation of the heat sensor. In particular, since the maximum setting temperature of the heat sensor is 150° C., high versatility can be obtained by setting the lower limit of the thermal decomposition starting temperature to over 150° C.

The manner of the extinguishant composition of the present invention having the above constitution is not particularly limited, and it can be used as a liquid such as a dispersion or a powder or a solid such as a molded article of a desired shape. In case of a dispersion, it can also be used as a coating agent for spraying. Further, the molded article can be in the form of granules, pellets of desired shape (columnar shape, etc.), tablets, spherical shapes, circular plates and the like, and the apparent density thereof is preferably 1.0 g/cm$^3$ or more.

<Aerosol-Generating Automatic Extinguishing Device>

The aerosol-generating automatic extinguishing device of the present invention uses the extinguishant composition of the present invention, and may be either of a device which does not have an ignition means for igniting the fuel of Component A (first aerosol-generating automatic extinguishing device), or a device which has a known initiator or a detonator for igniting the fuel of Component A (second aerosol-generating automatic extinguishing device).

The first aerosol-generating automatic extinguishing device without the ignition means can be made in the form where the extinguishant composition of the present invention is contained in a combustible or incombustible container. As the automatic extinguishing device, the device where the extinguishant composition of the present invention is contained in a combustible container can be used, for example, by throwing the whole of the aforementioned container into a flame.

As the aerosol-generating automatic extinguishing device of the present invention, the device where the extinguishant composition of the present invention is contained in an incombustible container can be used, for example, by sprinkling the extinguishant composition through the opening of the container to the igniting cooked contents (igniting contents in a pan, etc.).

Further, the aerosol generating automatic extinguishing device of the present invention can be used in a manner where the extinguishant composition of the present invention is contained in a container made of a material having good thermal conductivity (aluminum, copper, etc.), and further, the container may have a fin structure for increasing the surface area in order to enhance heat collection effect. This automatic extinguishing device can be used, in order to deal with when a fire occurs due to an unlikely ignition, for example, by placing near various batteries.

The second aerosol-generating automatic extinguishing device having the ignition means may be the device which has the extinguishant composition of the present invention as a fire extinguishant, a container with the ignition means, and a heat sensor for transmitting the fire occurrence to the ignition means to operate.

EXAMPLE

Examples 1 to 9 and Comparative Examples 1, 3 and 4

Component A, Component B and Component C shown in Table 1 were thoroughly mixed in the blending ratios (as dry matter not containing water) shown in Table 1, and an ion exchanged water equivalent to 10 parts by mass was added to 100 parts by mass of the total amount of Component A, Component B and Component C, and then further mixed. The thus obtained water-moist mixture was dried in a constant temperature oven at 110° C.×16 hours to obtain a dried product having a water content of 1% by mass or less.

Next, the dried product was pulverized in an agate mortar and sized to a particle diameter of 500 μm or less to obtain a pulverized product. 2.0 g of the pulvelized product was filled in a predetermined metal mold (die) having an inner diameter of 9.6 mm, and a punch was inserted, and a hydraulic pump pressurized with a surface pressure of 220.5 MPa (2250 $kg/cm^2$), every 5 seconds by exerting pressure from both sides to obtain the extinguishant compositions 1 to 9 of the present invention and comparative extinguishant compositions 1, 3 and 4 in the form of molded article.

Example 10

A pulverized product was prepared in the same manner as in Example 1, and this pulverized product was used as an extinguishant composition 10 of the present invention.

Example 11

1.2 g of the pulverized product obtained in the same manner as in Example 1 was filled in a predetermined metal mold (die) having an inner diameter of 9.6 mm, and a punch was inserted, and a hydraulic pump pressurized with a surface pressure of 0.5 MPa (50 $kg/cm^2$), every 5 seconds by exerting pressure from both sides to obtain the extinguishant composition 10 of the present invention.

Example 12 and 13

1.7 g of the pulverized product obtained in the same manner as in Example 1 was filled in a predetermined metal mold (die) having an inner diameter of 9.6 mm, and a punch was inserted, and a hydraulic pump pressurized with a surface pressure of 73.5 MPa (750 $kg/cm^2$), every 5 seconds by exerting pressure from both sides to obtain the extinguishant compositions 12 and 13 of the present invention.

Comparative Example 2

Only 2.0 g of Component C shown in Table 1 was filled in a predetermined metal mold (die) having an inner diameter of 9.6 mm, and a punch was inserted, and a hydraulic pump pressurized with a surface pressure of 220.5 MPa (2250 $kg/cm^2$), every 5 seconds by exerting pressure from both sides to obtain the comparative extinguishant composition 2.

Evaluation Test (1) Apparent Density

The apparent density of the extinguishant composition composed of the molded article obtained as described above was calculated by measuring the outer diameter and height of the cylindrical molded article with a digital caliper, and dividing the weight by the volume obtained from the measured data, and the results are shown in Table 1.

(2) Extinguishing Test 1

The extinguishing test 1 was carried out in the apparatus shown in FIG. 1.

An iron wire mesh 2 was placed on a support table 1, and the compositions (molded articles) 6 of Examples and Comparative Examples were placed in the center portion thereof. Example 10 (pulverized product) was placed in the center portion of the wire mesh 2 in a state of being put in an aluminum dish. The wire mesh 2 was covered with a transparent container (5 L) made of heat-resistant glass to seal the parts other than the part facing the metal mesh 2. A dish 5 containing 100 ml of n-heptane as an igniting agent was placed immediately under the extinguishant composition 6 via the wire mesh 2. In this manner, n-heptane was ignited to generate a flame 7, and the extinguishant composition 6 was heated to generate an aerosol, and it was observed whether or not the flame 7 could extinguish. The results are shown in Table 1.

(3) Extinguishing Test 2

Figure 2:
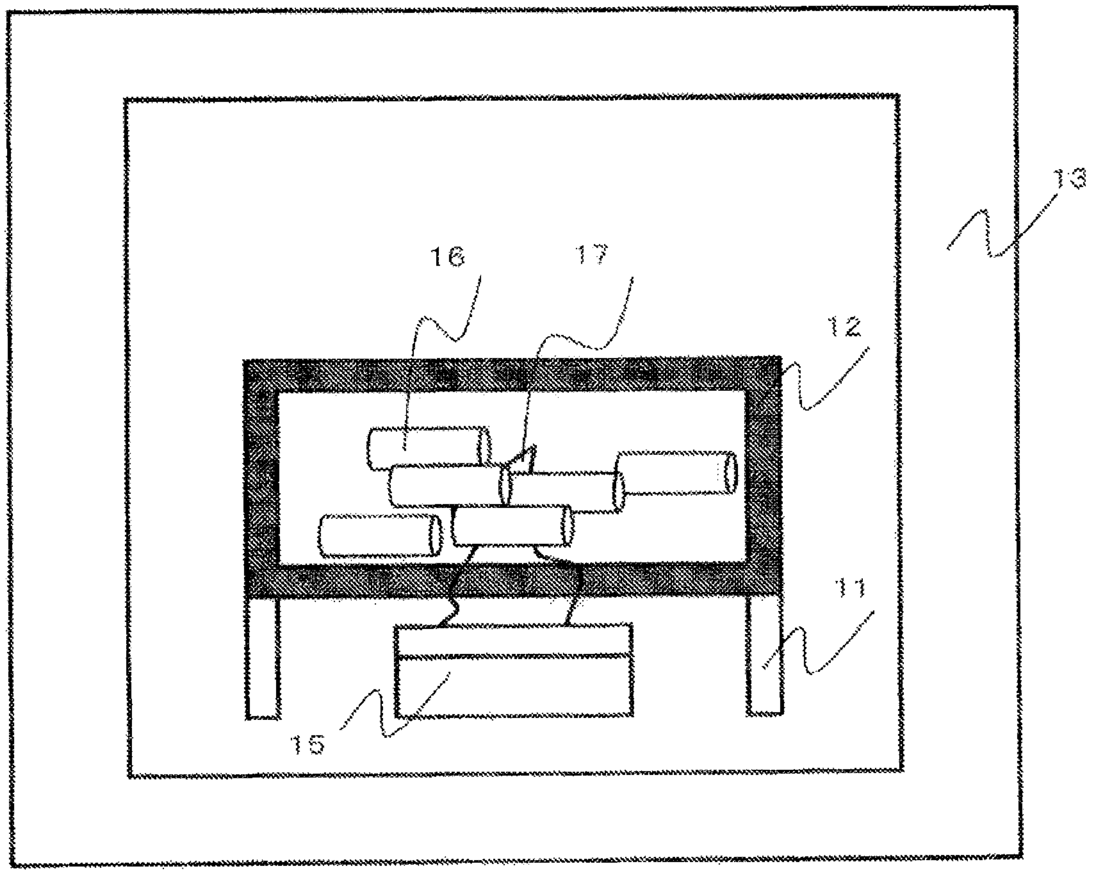
FIG. 2 is another diagram for explaining the test method of the confirmation test of extinguishing test by using an extinguishant composition of the present invention (combustion space volume being 2000 L).

The extinguishing test 2 was carried out in the apparatus shown in FIG. 2.

An iron wire mesh container 12 was placed on a support table 11, and the compositions (molded articles) 16 of Examples and Comparative Examples were placed in the container. A dish 15 containing 100 ml of n-heptane as an igniting agent was placed immediately under the extinguishant composition 16 via the wire mesh 12. These support table 11, the iron mesh container 12 and the dish 15 were placed a metal chamber 13 (2000 L) with a observing window. In this manner, n-heptane was ignited to generate a flame 17, and the extinguishant composition 16 was heated to generate an aerosol, and it was observed through the observing window whether or not the flame could extinguish. The results are shown in Table 1.

TABLE 1

| | Formulation (wt/wt %) | | | | | | | | |
|---|---|---|---|---|---|---|---|---|---|
| | | | Component C | | | | | | |
| | Component A CMC-Na | Component B $KClO_3$ | tripotassium citrate | potassium acetate | tripotassium ethylenediaminetetra-acetate | potassium hydrogen phthalate | potassium oxalate | potassium propionate | potassium bicarbonate |
| Ex. 1 | 28.08 | 71.92 | 11.00 | | | | | | |
| Ex. 2 | 28.08 | 71.92 | 43.00 | | | | | | |
| Ex. 3 | 28.08 | 71.92 | 100.00 | | | | | | |
| Ex. 4 | 28.08 | 71.92 | | 43.00 | | | | | |
| Ex. 5 | 28.08 | 71.92 | | | 100.00 | | | | |
| Ex. 6 | 28.08 | 71.92 | | | | 11.00 | | | |
| Ex. 7 | 28.08 | 71.92 | | | | | 11.00 | | |
| Ex. 8 | 28.08 | 71.92 | | | | | | 11.00 | |
| Ex. 9 | 28.08 | 71.92 | | | | | | | 11.00 |
| Ex. 10 | 28.08 | 71.92 | 100.00 | | | | | | |

TABLE 1-continued

| | | | | |
|---|---|---|---|---|
| Ex. 11 | 28.08 | 71.92 | 100.00 | |
| Ex. 12 | 28.08 | 71.92 | 233.00 | |
| Ex. 13 | 28.08 | 71.92 | 900.00 | |
| Com. Ex. 1 | 28.08 | 71.92 | | |
| Com. Ex. 2 | | | | 100.00 |
| Com. Ex. 3 | 28.08 | 71.92 | 5.30 | |
| Com. Ex. 4 | 28.08 | 71.92 | | |

| | Formulation | Total endothermic peaks of potassium salt alone (J/g) | | Extinguishing Test | | |
|---|---|---|---|---|---|---|
| | (wt/wt %) Component C MONNEX (potassium alofonate) | @DSC10° C./min temp. rising in range of 100-440° C. | Apparent density (g/cm$^3$) | Amount to be used of composition (g/device) | Space volume to be extin-guished (L) | Success or failure of extinguish-ment |
| Ex. 1 | | 267 | 1.7 | 2.0/1 | 5 | Success |
| Ex. 2 | | | 1.7 | 2.0/1 | 5 | Success |
| Ex. 3 | | | 1.7 | 2.0/1 | 5 | Success |
| Ex. 4 | | 178 | 1.7 | 2.0/1 | 5 | Success |
| Ex. 5 | | 201 | 1.7 | 2.0/1 | 5 | Success |
| Ex. 6 | | 406 | 1.7 | 2.0/1 | 5 | Success |
| Ex. 7 | | 307 | 1.7 | 2.0/1 | 5 | Success |
| Ex. 8 | | 140 | 1.7 | 2.0/1 | 5 | Success |
| Ex. 9 | | 860 | 1.7 | 2.0/1 | 5 | Success |
| Ex. 10 | | 267 | 1.0 | 2.0/1 | 5 | Success |
| Ex. 11 | | | — | 2.0 | 5 | Success |
| Ex. 12 | | | 1.5 | 2.0/50 | 2000 | Success |
| Ex. 13 | | | 1.5 | 2.0/50 | 2000 | Success |
| Com. Ex. 1 | | — | 1.7 | 2.0/1 | 5 | Failure |
| Com. Ex. 2 | | 860 | 1.7 | 2.0/1 | 5 | Failure |
| Com. Ex. 3 | | 267 | 1.7 | 2.0/1 | 5 | Failure |
| Com. Ex. 4 | 43.00 | 971 | 1.7 | 2.0/1 | 5 | Failure |

The extinguishant compositions of every example could extinguish. With respect to Comparatives, the flame was diminished temporarily, but could not extinguish.

EXPLANATION OF SYMBOLS

1, 11: Support desk
2, 12: Metal mesh
3, 13: Container
5, 15: Igniting agent
6, 16: Extinguishant composition
7, 17: Flame

The invention claimed is:

1. An extinguishant composition comprising 20 to 50% by mass of a fuel and 80 to 50% by mass of a chlorate, and further 6 to 1000 parts by mass of a potassium salt in relation to a total of 100 parts by mass of the fuel and the chlorate, and the extinguishant composition having a thermal decomposition starting temperature in the range of over 90° C. to 260° C., wherein the potassium salt is at least one selected from the group consisting of potassium acetate, potassium propionate, monopotassium citrate, dipotassium citrate, tripotassium citrate, potassium trihydrogen ethylenediaminetetraacetate, dipotassium dihydrogen ethylenediaminetetraacetate, tripotassium hydrogen ethylenediaminetetraacetate, tetrapotassium ethylenediaminetetraacetate, potassium hydrogen phthalate, dipotassium phthalate, potassium hydrogen oxalate, dipotassium oxalate, and potassium bicarbonate, the fuel is at least one selected from the group consisting of dicyandiamide, nitroguanidine, guanidine nitrate, urea, melamine, melamine cyanurate, avicel, guar gum, sodium carboxymethylcellulose, potassium carboxymethylcellulose, ammonium carboxymethylcellulose, nitrocellulose, aluminum, boron, magnesium, magnalium, zirconium, titanium, titanium hydride, tungsten, and silicon, and the extinguishant composition is configured to be ignited automatically by a heat due to a fire or ignited by a device having an initiator or a detonator.

2. The extinguishant composition according to claim 1, wherein a total amount of endothermic peaks observed in a DSC (Differential Scanning calorimetry) analysis of the potassium salt at a temperature rising of 10° C. per minute between 100° C. and 440° C. is 100 J/g to 900 J/g.

3. The extinguisher composition according to claim 1, wherein the potassium salt is a compound that generates potassium radicals by thermal energy.

4. The extinguishant composition according to claim 1, which is a solid composition such that the fuel is a compound which burns together with the chlorate to generate thermal energy.

5. The extinguishant composition according to claim 1, which is a solid composition such that the chlorate is an oxidant compound which burns together with the fuel to generate thermal energy.

6. The extinguishant composition according to claim 5, wherein the chlorate is at least one of potassium chlorate, sodium chlorate, strontium chlorate, ammonium chlorate and magnesium chlorate.

7. The extinguishant composition according to claim 1, wherein an apparent density is 1.0 g/$cm^3$ or more.

8. An aerosol-generating automatic fire-extinguishing device comprising the extinguishant composition according to claim 1.

* * * * *